Aug. 29, 1967  F. E. WARFIELD, JR  3,338,029
METHOD OF AND APPARATUS FOR CONDENSING ODIFEROUS GASES
Filed Oct. 21, 1965  3 Sheets-Sheet 1
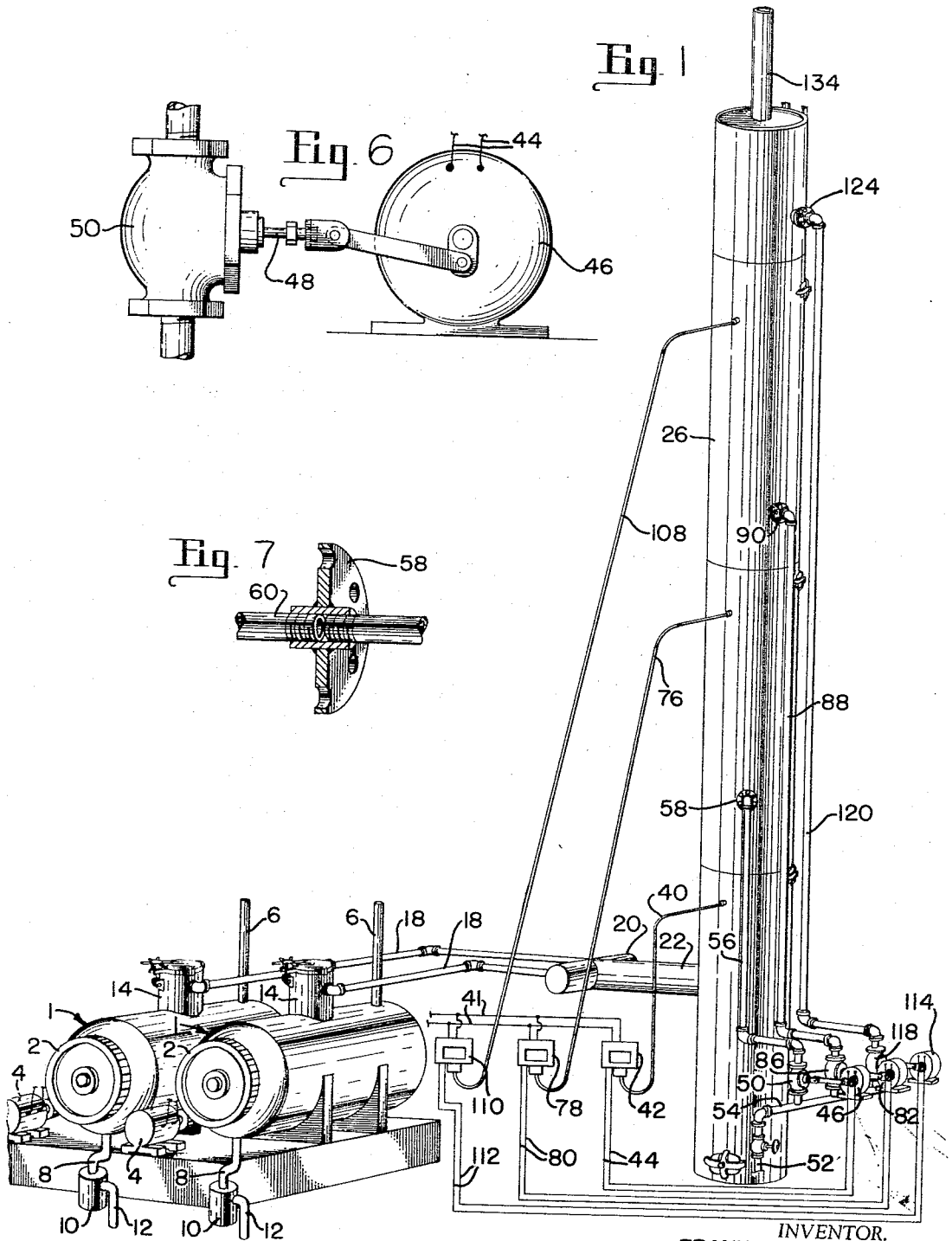
INVENTOR.
FRANK E. WARFIELD, JR.
BY
Wayland D. Keith
HIS AGENT

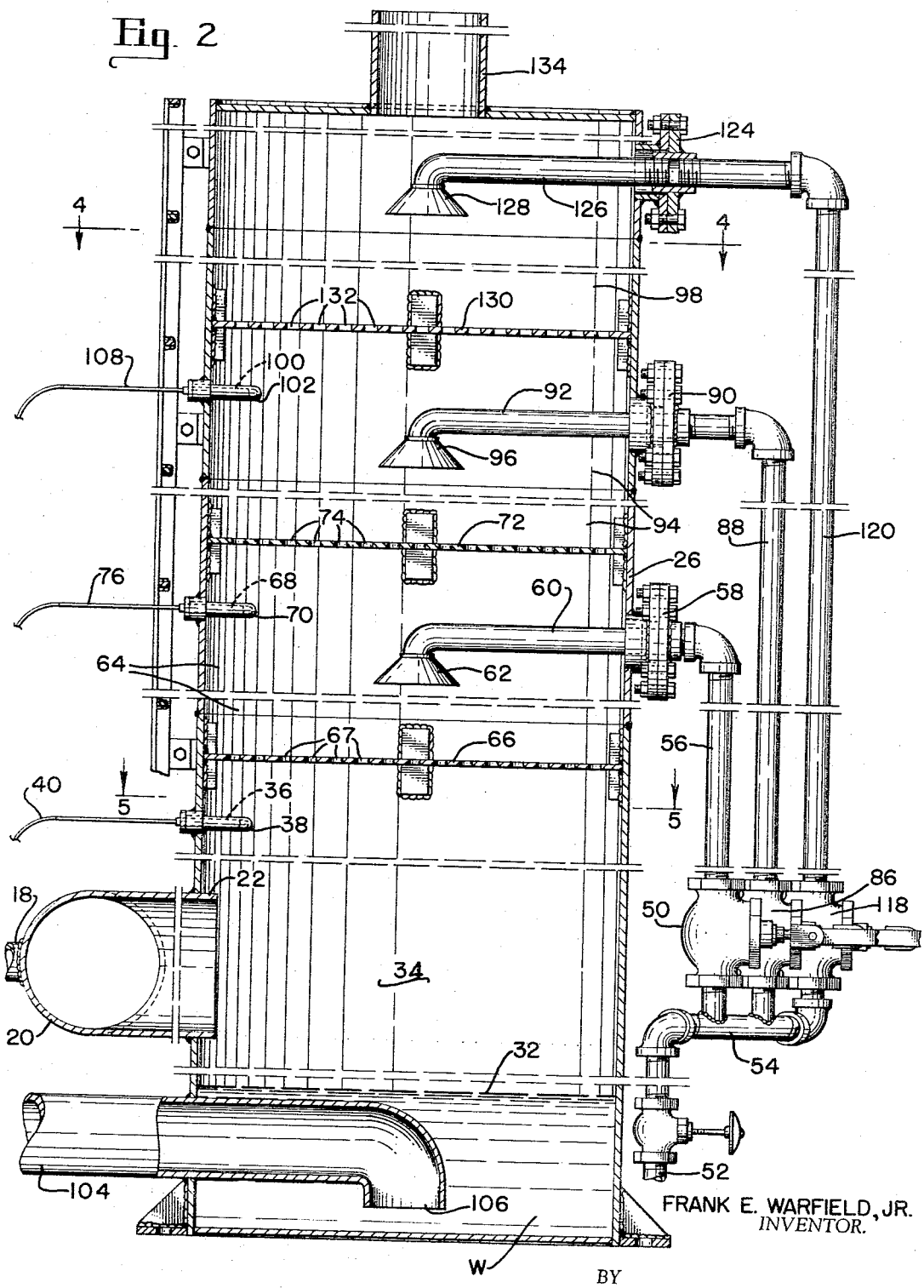

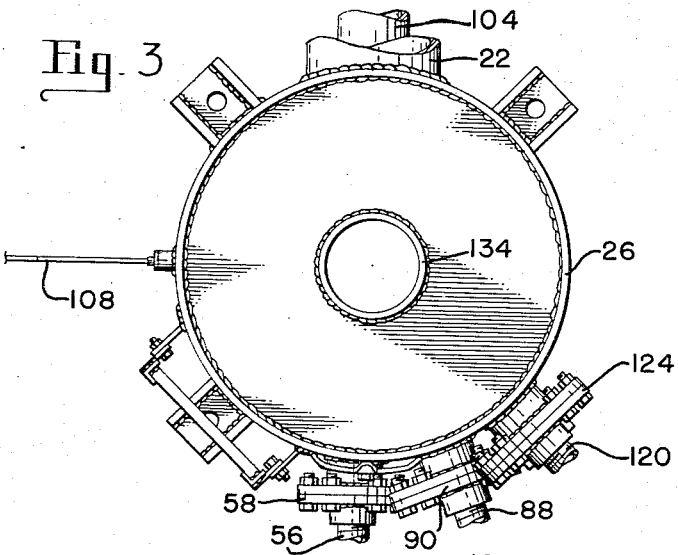
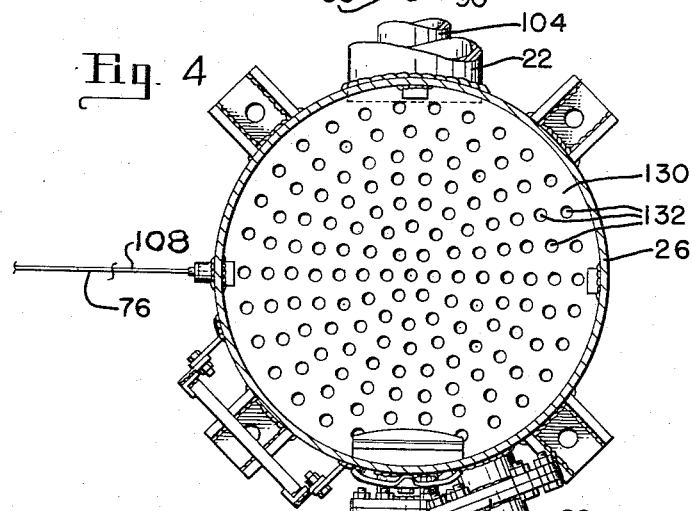
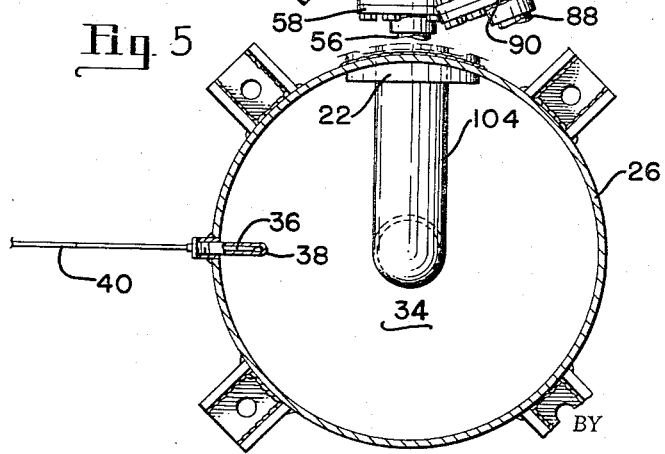

United States Patent Office 3,338,029
Patented Aug. 29, 1967

3,338,029
METHOD OF AND APPARATUS FOR
CONDENSING ODIFEROUS GASES
Frank E. Warfield, Jr., Wichita Falls, Tex., assignor to Central Manufacturing Company, Wichita Falls, Tex., a corporation of Texas
Filed Oct. 21, 1965, Ser. No. 499,669
5 Claims. (Cl. 55—20)

This invention relates to improvements in apparatus for and method of deodorizing odiferous gases and more particularly to deodorization of gases which result from rendering animal carcasses, the by-products and waste from meat packing plants, dehydrolyzation of feathers and the like. Plants which process waste animal material, in cookers and rendering vessels, such as carcasses, feathers and other products and by-products from such plants and from packing plants normally give off odiferous gases, which make it necessary that such plants locate away from populous centers of industry, but if not so located, they must conform to many state laws and local ordinances, to be able to operate.

Since the source of material on which such plants operate is usually to be found in the more or less populated areas, it is necessary to locate plants close to the source of material, but the stench and odors usually make it impractical to so locate a plant for the best operating advantage.

Heretofore, efforts to eliminate odors from such plants have, for the most part, been ineffective and expensive. Heretofore attempts to decrease the stench from such plants have been so expensive that it was usually less burdensome to tolerate the odor from the gases and make a profit, than to make an effort to eliminate the odors, with little, if any profits from the operation of the plant.

Various attempts have been made to remove odors from the gases from rendering plants which utilize cookers, rendering vessels or apparatus to dehydrolyze feathers and the like, however these, for the most part, were complex in construction, only partially effective in operation, and therefore did not justify the cost of operation.

The present invention, which includes the apparatus for and method of processing materials which give off odiferous gases from cookers, rendering vessels, feather hydrolyzing equipment, and is so constructed and operated as to reduce the odor of the odiferous gases to an unobjectionable level, in fact, with the present invention, plants, which could heretofore be located only in remote areas, apart from other businesses, can be located in industrial areas, without being offensive to the neighboring establishments, which is a great advance in the art of eliminating odiferous gases.

While the present invention is described herein with some particularity with respect to rendering plants, which process animal carcasses or the by-products from rendering plants and packing plants and the like, to render the gases from the cookers or rendering vessels and the like substantially free of objectionable odors, it is to be understood that the invention may also be applied to any other field of endeavor to which it is applicable, for the removal of odiferous gases, so long as the gases are miscible with and adsorbable by a liquid being sprayed into a chamber in accordance with planned steps for the deodorization. While water is presently mentioned as the primary agent for gathering the odiferous gases into solution with the droplets of water in the tower in which the deodorization takes place, it is to be understood that certain other materials and/or deodorizing or neutralizing agents may be mixed into the water stream, when water is used, so as to further and more rapidly deodorize the odiferous gases which result from cooking or rendering animal products or from dehydrolyzing feathers and the like.

The present apparatus and process enables the continuous removal of obnoxious stench from the gases which emanate from cookers or rendering vessels, by entraining the odor producing molecules in a liquid, such as water, or water and an additive and directing the resultant mixture into a sewer line, either for discharge at a remote point, or to be directed through various type filters, which are old to the art, and to which the applicant makes no claim, per se, as the purification of such liquids is well known in the art of sewage treatment.

An object of this invention is to provide an apparatus for and a method of treating and condensing odiferous gases into a solution and passing the solution to a point of discharge or to further purification.

Another object of the invention is to provide an apparatus for and method of removing obnoxious odors from the gases emanating from vessels in which animal products are processed, which apparatus is so designed as to neutralize the odors from the gases or to condense the gases, by spray action, to be discharged as liquid for further purification.

Still another object of the invention is to provide an apparatus which enables the condensing of odiferous gases, as the gases pass through a receptacle in the form of a tower.

Yet a further object of the invention is to provide a thermal controlled apparatus which will automatically provide additional spray for condensation as the odiferous gases rise into the tower.

With these objects in mind and others which will become manifest as the description proceeds, reference is to be had to the accompanying drawings, in which like reference characters designate like parts in the several views thereof, in which:

FIG. 1 is a diagrammatic, perspective view of a rendering plant, showing two cookers, with the mechanism for agitating the material therein, and showing the vapor line leading therefrom into a header and into a tower, which embodies the present invention, and showing thermocontrols at the various levels in the tower, as well as the piping and the control to direct water sprays at different levels into the tower;

FIG. 2 is an enlarged, vertical sectional view through the tower, with portions being shown in full outline, portions being cut away and removed in order to show the component elements therein on a relatively large scale, and showing the various spray pipes and spray heads within the tank, as if the pipes were laid in substantially a common plane, however, the piping is spaced around the periphery of the tower, substantially as shown in FIG. 3;

FIG. 3 is a top plan view of the invention with portions thereof being broken away;

FIG. 4 is a sectional view taken on the line 4—4 of FIG. 2, looking in the direction indicated by the arrows, and with parts being broken away;

FIG. 5 is a sectional view taken on the line 5—5 of FIG. 2, looking in the direction indicated by the arrows;

FIG. 6 is an elevational view of a motor and motor operated valve shown apart from the system; and FIG. 7 is an enlarged perspective view of a flanged connection for directing the coolant spray pipes into the tower.

With more detailed reference to the drawing, the numeral 1 designates generally cookers or processing equipment to process various forms of waste from packing plants, animal carcasses and for dehydrolyzing feathers and the like. The cookers 1 include agitating equipment which is driven by gears 2 and motors 4 in a manner well known in the art of rendering plants. Various type cookers and apparatus for processing the material which emits odiferous gases may be used, most of which are steam jacketed. In the cookers 1, as shown in FIG. 1, steam is directed into the jacket of the cookers through steam pipes 6, whereupon, the steam passes therethrough and is condensed and passes out through pipes 8 into steam traps 10, with the condensate passing out through pipes 12, which is conventional in the art of double jacketed steam cookers for rendering plants, and other industries.

The charging of the cookers is done through a manhole formed in the respective domes 14, which manholes or charge openings in the respective domes are each closed by a lid or door in pressure relation, as is well known in the art of such closures. A vapor line 18 leads from each of the domes 14, which vapor lines connect to a common header 20, which header 20, in turn connects with a distribution pipe 22. The distribution pipe 22 is welded or otherwise secured to the shell of the tower 26, a spaced distance upward from the bottom thereof and is in fluid communication with the tower 26 to direct odiferous gases from the common header 20 into the tower 26, a spaced distance from the bottom thereof, which distribution pipe 22 directs the odiferous gases which pass therethrough into chamber 34 of the tower 26.

In the case of cooking or rendering carcasses of animals or portions thereof, the steam emanating from cookers 1 through vapor lines 18 into and through header 20, into distribution pipe 22 and into tower 26 will be odorous. The steam will be discharged into the shell of the tower 26 through the distribution pipe 22, and since the level of water W is normally maintained, as indicated at 32, a portion of the steam will be condensed upon contact relation with the water W, whereupon, a portion of the steam, in which odiferous gases are entrained, will rise upward within chamber 34 to heat a first thermosensing bulb or element 36 within thermowell 38. In so doing the thermosensing bulb or element 36, within thermowell 38 will cause expansion of fluid therein to exert a pressure on fluid loaded capillary tube 40 which leads to a conventional proportioning indicating temperature controller 42, which is of conventional type, as manufactured by Minneapolis-Honeywell Regulator Co. and by other companies. This controller is of the type to close a circuit 41 upon reaching a predetermined temperature setting, then, upon closing the circuit, electrical current is directed from circuit 41 through controller 42 into circuit 44, then to a motor 46 to energize the motor, which motor has a crank and linkage arrangement attached thereto, as will best be seen in FIG. 6, whereupon, the motor will operate through a cycle to move a valve stem 48 within valve 50. The controller 42 is so designed as to close the circuit 44 to actuate motor 46, which will move the stem 48 of valve 50 outward, which will direct liquid, such as water, from supply pipe 52 into header 54 and thence through valve 50 into pipe 56 and through a flanged coupling arrangement 58 to which a pipe 60 is connected, as will best be seen in FIG. 7. Whereupon, water will be directed outward through spray head 62 within chamber 64 and onto perforate baffle 66, as the odiferous gases rise upward therethrough, the water will chill the gases and cause condensation thereof, and at the same time, the mist-like spray which comes from spray head 62 will mix with the gases and the odor bearing gases will become mixed with water and will be condensed to pass downward through baffle 66 and by the discharge end of distribution pipe 22 to further chill incoming odiferous gases. The distribution pipe 22 supplies the gases to tower 26. As long as the heated gases heat the thermosensing bulb or element 26, valve 50 will remain open so as to spray the area in which perforations 67 are located, which is in perforate baffle 66. The spray head 62 is of sufficient height above the baffle that the area will be thoroughly sprayed with a fine mist, so as to chill and condense the gases.

A second thermosensing bulb or element 68 is positioned within thermowell 70 within chamber 64, above spray head 62 and below a second perforate baffle plate 72, the perforations of which are indicated at 74. With the steam rising upward through perforations 67 into chamber 64 to heat the second thermosensing bulb or element 68 within the second thermowell 70, the second thermosensing bulb or element 68 will cause expansion of fluid therein, such as mercury, which will create pressure on capillary tube 76 which is in communication with thermosensing bulb 68 and a second proportioning indicating temperature controller 78, which controller has an electrical cricuit 41 leading thereto, FIG. 1, which controller actuates a switch therein to close a circuit 80 when the temperature within chamber 64 reaches a predetermined heat, whereupon, the circuit 80 will actuate a motor 82 which, in turn, will actuate a valve stem within valve 86 to direct water or other cooling fluid from header 54 through valve 86 into pipe 88 and thence through a flanged coupling 90 to direct the cooling fluid into pipe 92 within chamber 94. The pipe 92 has a spray head 96 thereon to spray water or other cooling fluid, in the form of fine mist, into chamber 94 downward toward baffle plate 72. The baffle plate 72 is a sufficient distance below spray head 96 so that the entire area is saturated with the finely divided particles of water, to further chill the odiferous gases which pass up through perforations 67 in perforate baffle 66.

The tower 26, as shown in FIG. 2, is relatively tall and from which, in the drawings, various sections have been removed, thereby shortening the chambers, but which shows the details within the chambers on a larger scale. Therefore, each of the chambers has many feet of space in which to contact the mist and the odiferous gases upon the ascent of the odiferous gases and the descent of the particles of water in the form of fine mist.

So long as the spray from spray heads 62 and 96 do not permit the next higher or third thermosensing bulb or element 100, in the upper portion of chamber 94, to become heated, spray from the first and second spray heads 62 and 96 will condense the odiferous gases, whereupon, as water passes downward through perforations 74 and 67 in the respective baffles 72 and 66, into chamber 34 to settle in the lower portion of the chamber, as indicated at W, with the water line 32 being maintained below the distribution pipe 22. The water will be maintained at substantially this constant level, with the outlet pipe 104 withdrawing water and sediment and the condensates from the odiferous gases from a down-turned neck 106 which is positioned on the inner end of pipe 104.

Should the heat within chamber 94 rise to the upper portion thereof to cause thermosensing element or bulb 100, which is similar to elements 36 and 68 described above, to cause expansion of fluid therein to create pressure in capillary tube 108 to actuate a switch within a third proportioning indicating temperature controller 110, which controller is also connected to a source of electricity through circuit 41, whereupon, the electrical circuit 112 will be energized to actuate motor 114, which motor has a crank and linkage arrangement interconnected with valve stem of valve 118, whereupon, the valve 118 is opened the desired amount to direct the cooling fluid, such as water, or water and an additive, from supply pipe 52, which is connected to header 54, whereupon, the water is directed into a pipe 120 which extends to and is connected with a flange connection 124, such as shown in FIG. 7, to direct the water or cooling fluid into a pipe 126, which pipe is connected to the inner side of flanged connection 124, which pipe 126 has a spray head 128 thereon within chamber 98. The spray head 128 is positioned a sufficient distance above the third baffle 130, which baffle has perforations 132 therein, so that the spray will cover the perforate area and intermix with the odiferous gases to flow upward from the lower chambers 34, 64 and 94 therethrough and into chamber 98.

Three spray heads and three perforate baffles, which define spaced apart chambers, have been shown for condensing the odiferous gases passing upward therethrough, and since the tower may be made to such height, 30 feet, 40 feet or more, as to perform the function of condensing the vapors carrying the stench and odor laden gases and purifying the gases which may pass up and out through stack 134. However, it has been found that by spraying chilled water or other cooling fluid into a chamber containing steam, which, upon condensing the steam and reducing the B.t.u. units therein, that a partial vacuum can actually be made to exist, therefore, in such cases, no odiferous gases will pass out through vapor stack 134. It is, however, sometimes not commercially feasible to use chilled water to the extent necessary to perform a process to this perfection, as the gases, which have been purified by the multiple sprays and multiple baffle arrangement will be so cleansed as to be substantially odorless.

While the invention has been shown and described in some detail with respect to use with equipment for rendering plants, it is to be understood that the apparatus for and method of deodorizing gases may be practiced within the scope herein defined with any equipment to which it is applicable, and that changes may be made in the minor details of construction without departing from the spirit of the invention or the scope of the appended claims.

Having thus clearly shown and described the invention, what is claimed as new and desired to be secured by Letters Patent is:

1. A method of removing odors from heated, odiferous gases, which method comprises the steps of;
    (a) passing heated, odiferous gases upwardly in a closed vessel,
    (b) creating a plurality of spaced apart spray zones, which zones lie one above the other, within the vessel,
    (c) providing a heat sensor in each of the spaced apart zones within the vessel, and
    (d) initiating spraying in a lower zone and sequentially spraying in zones thereabove, in direct proportion to the action on said heat sensors by the upward movement of the heated, odiferous gases in the respective zones.

2. An apparatus for condensing odiferous gases, which apparatus comprises;
    (a) a vertical tower to receive hot, odiferous gases,
        (1) an inlet for odiferous gases formed in the lower portion of said tower,
        (2) a plurality of perforate baffles, which define zones at spaced intervals, within said tower,
        (3) a spray head spaced above each said baffle,
        (4) a liquid supply pipe connected with each said spray head within said tower,
            (i) each said liquid supply pipe adapted to be connected with a source of liquid supply,
        (5) a discharge pipe in the lower portion of said tower for the discharge of liquid resulting from said spray heads and from the condensation of the odiferous gases,
    (b) a thermosensing element positioned within each said zone within the height of said tower,
    (c) a valve positioned within each liquid supply pipe leading to the respective spray heads, and
        (1) one said thermosensing element being associated in operative relation with each said valve in such manner as to sequentially actuate said valves in proportion to the upward movement of hot, odiferous gases within said tower to sequentially operate said spray heads in accordance with the upward movement of heat within said tower.

3. An apparatus for condensing odiferous gases as defined in claim 2; wherein
    (a) each thermosensing element is placed in a horizontal plane intermediate a baffle and a spray head.

4. An apparatus for condensing odiferous gases as defined in claim 2; wherein
    (a) each thermosensing element is connected within an electric circuit, and
    (b) a motor actuated valve within said electric circuit to actuate the valve to open and close the liquid supply pipes leading to said spray heads.

5. A method of condensing odiferous gases, which method comprises the steps of:
    (a) passing heated, odiferous gases upward in a closed vessel,
    (b) creating a plurality of vertically spaced apart spray zones within the height of the vessel,
        (1) providing a heat sensor in each of a plurality of the spaced apart spray zones within the vessel,
    (c) initiating spraying in a lower zone to condense at least a part of the heated, odiferous gases,
    (d) passing the uncondensed heated, odiferous gases upwardly into another spray zone to further condense at least part of the heated, odiferous gases, by contact with a spray in said another zone, said spray being activated in response to a signal from one of said heat sensors,
    (e) directing the condensate from the gases into the lower portion of the vessel,
    (f) maintaining the condensate from the gases at a predetermined level in the lower portion of the vessel, and
    (g) directing the condensate, which is odiferous, outward from the vessel.

References Cited
UNITED STATES PATENTS

| | | | |
|---|---|---|---|
| 1,543,942 | 6/1925 | Mathesius | 55—94 X |
| 2,241,674 | 5/1941 | Mohr et al. | 261—111 X |
| 2,250,260 | 7/1941 | Fowler | 55—20 |
| 3,183,645 | 5/1965 | Teller | 55—20 |

REUBEN FRIEDMAN, *Primary Examiner.*

J. ADEE, *Assistant Examiner.*